United States Patent
Rizzi et al.

(10) Patent No.: US 9,687,801 B2
(45) Date of Patent: Jun. 27, 2017

(54) ADIABATIC MULTI-BED CATALYTIC CONVERTER WITH INTER-BED COOLING

(71) Applicant: Casale SA, Lugano (CH)

(72) Inventors: Enrico Rizzi, Casnate con Bernate (CO) (IT); Ermanno Filippi, Castagnola (CH)

(73) Assignee: Casale SA (CH)

( * ) Notice: Subject to any disclaimer, the term of this patent is extended or adjusted under 35 U.S.C. 154(b) by 204 days.

(21) Appl. No.: 14/760,829

(22) PCT Filed: Nov. 19, 2013

(86) PCT No.: PCT/EP2013/074157
§ 371 (c)(1),
(2) Date: Jul. 14, 2015

(87) PCT Pub. No.: WO2014/117884
PCT Pub. Date: Aug. 7, 2014

(65) Prior Publication Data
US 2015/0352510 A1    Dec. 10, 2015

(30) Foreign Application Priority Data
Jan. 29, 2013    (EP) .................................... 13153127

(51) Int. Cl.
*B01J 8/04*    (2006.01)
*C01C 1/04*    (2006.01)

(52) U.S. Cl.
CPC .......... *B01J 8/0469* (2013.01); *B01J 8/0415* (2013.01); *B01J 8/0496* (2013.01); *C01C 1/0423* (2013.01);
(Continued)

(58) Field of Classification Search
CPC . B01J 8/0496; B01J 8/469; B01J 8/415; B01J 2208/00194; B01J 2208/00814; B01J 2219/00024
See application file for complete search history.

(56) References Cited

U.S. PATENT DOCUMENTS

| 4,372,920 A | 2/1983 | Zardi |
| 4,769,220 A | 9/1988 | Zardi |

(Continued)

FOREIGN PATENT DOCUMENTS

| EP | 0 272 448 A2 | 6/1988 |
| EP | 0 376 000 A1 | 7/1990 |

(Continued)

OTHER PUBLICATIONS

International Search Report issued in connection with PCT/EP2013/074157.

(Continued)

*Primary Examiner* — Lessanework Seifu
(74) *Attorney, Agent, or Firm* — Akerman LLP

(57) ABSTRACT

A multi-bed catalytic converter (1) with inter-bed heat exchangers, comprising a plurality of superimposed catalytic beds and a common heat exchanger (5) which is shared between two or more consecutive catalytic beds, said common heat exchanger including heat exchange bodies such as a tube bundle (6), and a wall system (9, 10) to define a tube side and a shell side respectively, and the shell side comprising at least a first space (12) and a second space (13), wherein the first space (12) receives the product gas leaving the first of said consecutive beds, and the inter-cooled gas leaving said first space (12) is admitted in the second bed (3-3) for further conversion, and a sealing means (14) preventing a direct gas passage from said first space to said second space.

15 Claims, 4 Drawing Sheets

(52) U.S. Cl.
CPC ............... *B01J 2208/00132* (2013.01); *B01J 2208/00194* (2013.01); *B01J 2208/00814* (2013.01); *B01J 2208/027* (2013.01); *B01J 2219/00024* (2013.01); *Y02P 20/52* (2015.11); *Y10T 29/49346* (2015.01)

(56) References Cited

U.S. PATENT DOCUMENTS 5,986,146 A    11/1999   Sioli
6,299,849 B1   10/2001   Pagani et al.

FOREIGN PATENT DOCUMENTS

| EP | 1 818 094 A1 | 8/2007 |
|----|--------------|--------|
| EP | 2 014 356 A1 | 1/2009 |
| GB | 660 540 A | 11/1951 |
| GB | 2 075 859 A | 11/1981 |
| JP | S60-110328 A | 6/1985 |

OTHER PUBLICATIONS

International Preliminary Report on Patentability issued in connection with PCT/EP2013/074157.

US 9,687,801 B2

ADIABATIC MULTI-BED CATALYTIC CONVERTER WITH INTER-BED COOLING

This application is a national phase of PCT/EP2013/074157, filed Nov. 19, 2013, and claims priority to EP 13153127.9, filed Jan. 29, 2013, the entire contents of both of which are hereby incorporated by reference.

FIELD OF THE INVENTION

The present invention relates to the field of multi-bed catalytic converters with inter-bed cooling.

PRIOR ART

Adiabatic multi-bed catalytic converters are used in several fields, including e.g. the synthesis of methanol and the synthesis of ammonia.

An inter-cooled multi-bed converter comprises a plurality of catalytic beds arranged in series, and one or more inter-bed heat exchangers for cooling the gaseous flow of partially-reacted products (briefly called products) passing from one bed to another.

A common layout can be described as follows. The converter is an elongated vertical pressure vessel hosting a catalytic cartridge; said cartridge includes a plurality of superimposed catalytic beds; each catalytic bed includes an annular cylindrical catalyst container with a central passage, and the inter-bed coolers are usually shell-and-tube heat exchangers fitted in the central passages of said containers. A suitable system of perforated walls directs the gaseous flow through the catalytic bed and, then, in the shell side of the heat exchanger, where the gas are cooled before they enter a subsequent bed or leave the converter.

The cooling medium in the tubes may be the fresh charge of gaseous reactants, to preheat the fresh charge at the expense of the heat recovered from cooling of products. According to various known embodiments, the inlet bed temperature can be adjusted by mixing the products with a certain amount of a quench medium. Said quench medium is usually a flow of reagents, for example a non-preheated portion of the available fresh charge.

A prior art converter with inter-bed heat exchangers is disclosed for example in U.S. Pat. No. 4,769,220.

A disadvantage of the known converters is that design and construction become sophisticated and expensive with multiple catalytic beds. For example, each shell-and-tube heat exchanger needs a respective bundle of tubes with two tube sheets; tube sheets are quite expensive items and weldings between tubes and the tube sheet require careful and expensive execution. The current prior art considers that a layout with more than three beds and two intermediate exchangers is not convenient. However there would be an incentive to increase the number of stages (that is, the number of catalytic beds) since more stages, in theory, may achieve a better efficiency and a more uniform temperature profile.

SUMMARY OF THE INVENTION

The invention is aimed to overcome the above drawbacks. Hence, a problem underlying the invention is to provide a novel design for a multi-bed inter-cooled converter, to simplify the mechanical construction, reduce costs and, hence, increase the convenience of a multiple-bed configuration.

This problem is solved with a multi-bed catalytic converter according to claim 1. The converter comprises a pressure vessel, a plurality of superimposed catalytic beds configured with a cylindrical annular catalyst container and an axial core passage, and means for the inter-bed cooling of a gas stream between at least two of said catalytic beds, and is characterized in that said means for inter-bed cooling include a heat exchanger comprises:

heat exchange bodies which extend axially and without a solution of continuity through the core passages of at least two consecutive catalytic beds, and a wall system which is also arranged in said core passages and surrounds said heat exchange bodies, to define a boundary of a shell side of said heat exchanger, and is further characterized in that said wall system is structured in such a way that:

the shell side of said heat exchanger comprises at least a first space and a second space, and said first space has a gas inlet and a gas outlet, the inlet being in communication with an outlet of a first of said consecutive catalytic beds, to receive a hot gas leaving said first bed, and the outlet being in communication with the inlet of a second of said consecutive catalytic beds, so that the inter-cooled gas leaving said first space can enter said second bed for further conversion, and said second space has a gas inlet in communication with the outlet of said second bed, and wherein the converter also comprises sealing means (14) to prevent a direct gas passage from said first space (12) to said second space (13).

Preferably, said wall system comprises a first cylindrical wall and a second cylindrical wall, the first wall surrounding an upper portion of said heat exchange bodies and the second wall surrounding a lower portion of said heat exchange bodies; the second wall is distanced from the first wall, so that they form a shell with a gap.

Said sealing means preferably comprises elastic ring members and a seal between said elastic ring members. Preferably the seal is a labyrinth seal. The shell of the common heat exchanger is usually coaxial to gas distribution walls distribution walls of the catalytic beds. Accordingly, a preferred form of the sealing means includes: a first elastic ring fixed to the heat exchange bodies; a second elastic ring fixed to a distribution wall of a catalytic bed.

Additional preferred features of the invention are in accordance with the attached dependent claims.

The invention provides a heat exchanger with a single set of heat exchange bodies, for example a tube bundle, which is in common between two or more consecutive catalytic beds. This heat exchanger is also termed "common" heat exchanger. Hence, related heat exchange bodies (and their passages for the cooling medium) extend through said two or more catalytic beds without any solution of continuity. The shell side of this common heat exchanger, on the other hand, is partitioned into two or more portions, corresponding e.g. to the above mentioned first space and second space.

In some embodiments, the converter may comprise a plurality of heat exchangers, including one or more common heat exchanger according to the invention, and one or more conventional heat exchangers. The cooling medium side (e.g. tube side) of the various heat exchangers are connected in such a way that the cooling medium passes from one to another.

A notable advantage of the invention is a simpler and less expensive design, owing to the common heat exchanger serving two or more catalytic beds. In particular, at least two tube sheets are eliminated. Tube sheets are a significant source of cost. A tube sheet is expensive to produce and, moreover, a lot of work is required for the welding of each tube to the tube sheet. If not executed properly, the connection to the tube sheet may also be a source of leakage. Hence, elimination of some tube sheets is a substantial advantage. In practice, the invention provides a great simplification of design of the converter, while keeping the feature of inter-bed cooling. It follows that a configuration with several catalytic beds may become more attractive, for example the invention allows for a competitive design with four or five catalytic beds.

A particularly preferred embodiment, especially for ammonia converters, has the following features: four superimposed catalytic beds; a top inter-bed exchanger, fitted in the central passage of the first annular bed and arranged to cool the hot flow leaving said first bed; a bottom inter-bed exchanger, in common between the second bed and third bed.

An aspect of the invention is a structurally independent catalytic cartridge according to the claims. This cartridge can be used also for the revamping of an existing converter, by replacing the old catalytic cartridge with a new one which is realized according to the invention.

These and other advantages and features of the invention will be elucidated with the help of the following description of preferred and non-limiting embodiments.

DETAILED DESCRIPTION OF PREFERRED EMBODIMENTS

Figure 1:
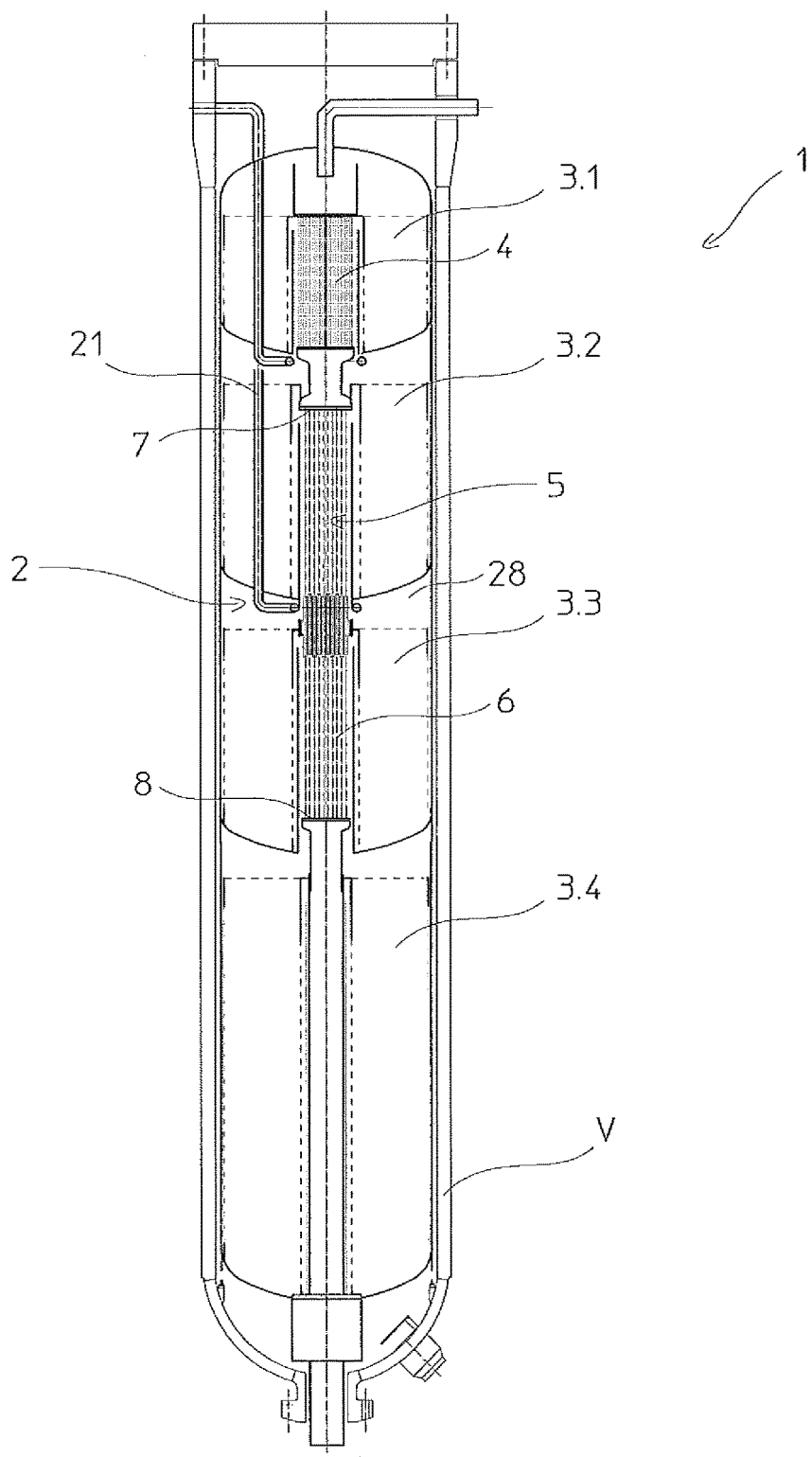
FIG. 1 is a simplified cross section of a full-opening catalytic reactor realized in accordance with an embodiment of the invention, and having four catalytic beds and a common heat exchanger for the second and third bed.

FIG. 1 discloses a converter 1, for example an ammonia or a methanol converter, comprising a pressure vessel V and a catalytic cartridge 2. Said cartridge 2 is equipped with four catalytic beds denoted with numerals 3.1 to 3.4. The cartridge 2 comprises a suitable basket with side walls and a bottom wall for each catalytic bed, according to known technique which need not be described here. The catalytic beds are arranged in series, that is the effluent leaving a catalytic bed passes to the next catalytic bed for a further step of reaction, possibly after mixing with a quenching gas.

Each bed is configured with annular cylindrical shape and has a central axial passage; shell-and-tube heat exchangers are arranged in the central passages of at least some of the catalytic beds, to provide inter-bed cooling of the gaseous products evolving from one catalytic bed to another.

More in detail, referring to FIG. 1 the converter 1 comprises a first heat exchanger 4 arranged inside the top catalytic bed 3.1, and a second heat exchanger 5. The second heat exchanger 5 is operatively shared between the catalytic beds 3.2, 3.3 and, for this reason, is also termed common heat exchanger.

Both exchangers 4 and 5 operate with the hot product stream flowing in the shell side, and cooling medium flowing in the tube side (i.e. inside the tubes). Said cooling medium may be a fluid in a separate circuit, such as water or steam, or may be represented by fresh reactants. In the shown embodiment, for example, fresh reactants admitted to the converter 1, or at least a part thereof, flow inside the tubes of the second exchanger 5 and then inside tubes of the first exchanger 4, before they enter the first bed 3.1 for the first stage of conversion.

The common heat exchanger 5 comprises a tube bundle 6 which extends axially and without a solution of continuity through the consecutive catalytic beds 3.2 and 3.3. The opposite ends of the tubes of said bundle 6 are fixed to an upper tubesheet 7 and to a lower tubesheet 8. Suitable means such as baffles prevent vibration of the tubes.

Figure 2:
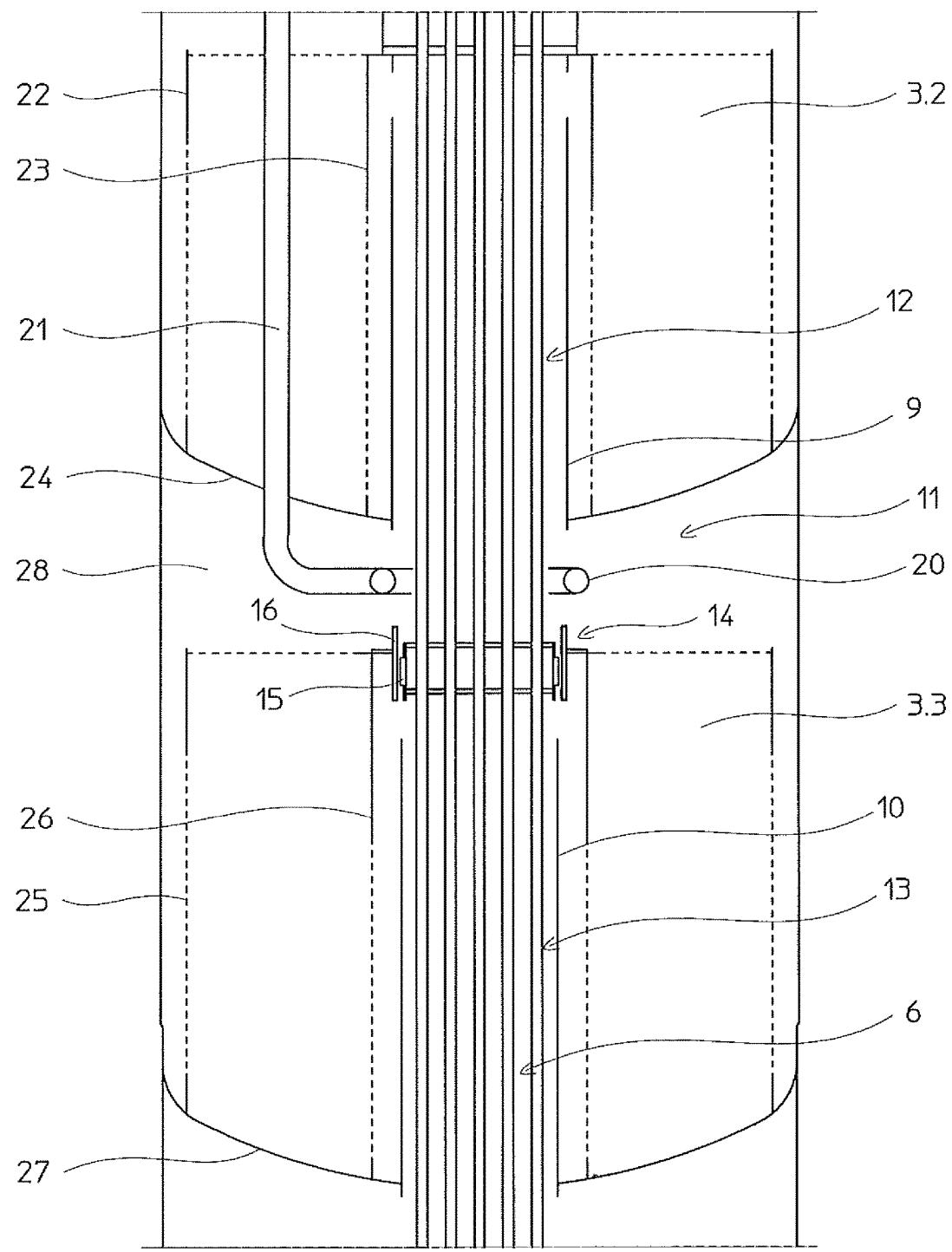
FIG. 2 is a scheme of the cross section of the converter of FIG. 1, in a region between the second and third catalytic bed.
Figure 3:
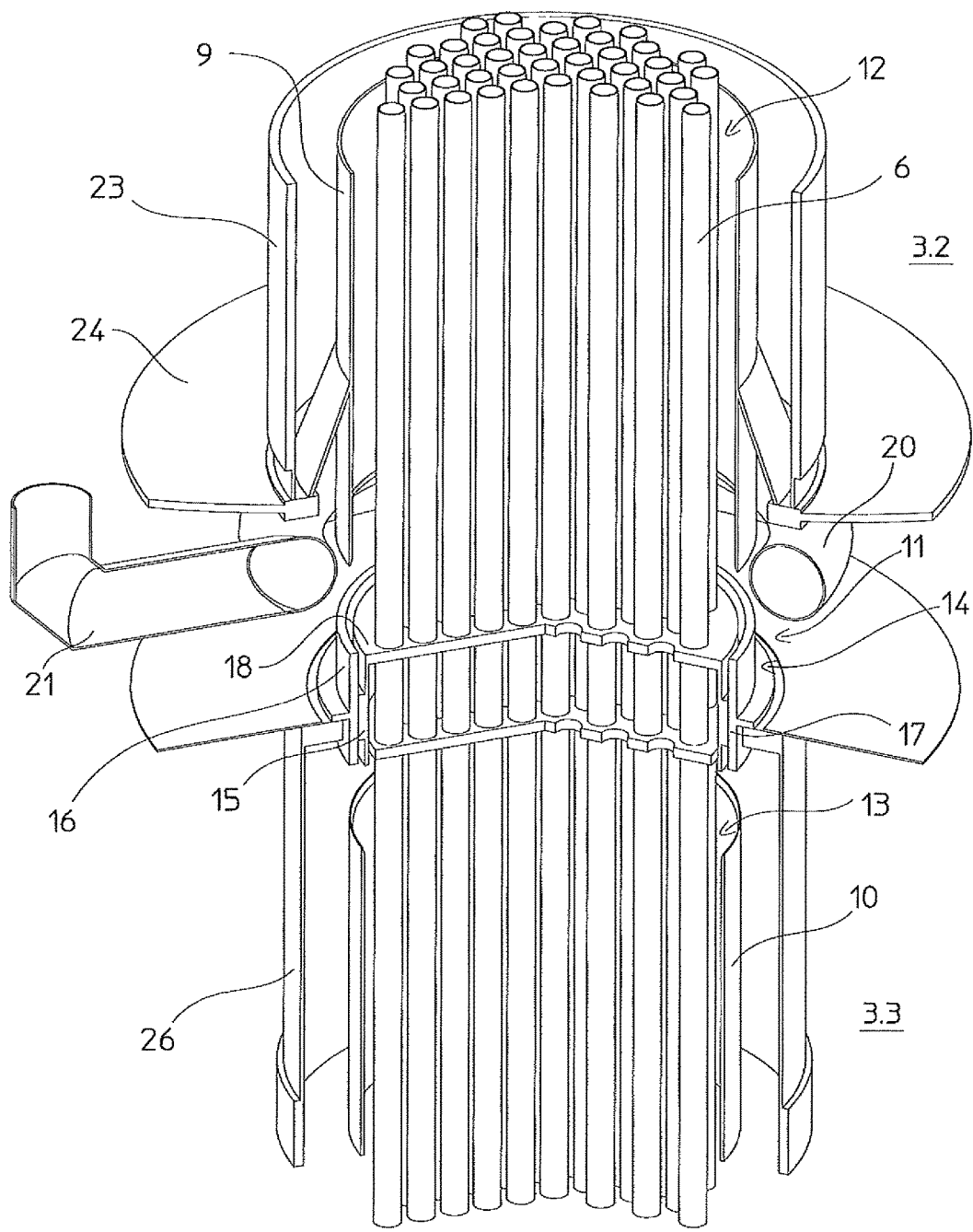
FIG. 3 is a perspective view of some components of the converter of FIG. 1, between the second and third catalytic bed.

The shell side of said common heat exchanger 5 is delimited by a wall system comprising a first cylindrical wall 9 and a second cylindrical wall 10 (FIGS. 2-3). The first wall 9 surrounds an upper portion of the tube bundle 6 inside the upper bed 3.2, and the second wall 10 surrounds a lower portion of the tube bundle which is inside the lower bed 3.3.

Said second wall 10 is axially distanced from the first wall 9, leaving a gap 11 in the wall system around the tube bundle 6. As a consequence, the shell side of the common heat exchanger 5 is substantially partitioned into a first portion and a second portion, namely the space 12 delimited by the first wall 9, and the space 13 delimited by the second wall 10.

Said two spaces 12, 13 are in no fluid communication, being separated by sealing means 14 arranged in the region of the gap 11. Hence, the gas leaving the first space 12 enters a substantially annular chamber 28, underneath the bottom cover of the bed 3.2, and from here it is directed to the subsequent catalytic bed 3.3. The sealing means 14, in other words, prevent undesired bypass of the catalytic bed 3.3.

In the example, said sealing means 14 includes an inner ring 15 and an outer ring 16 with a seal in between, preferably a labyrinth seal 17 (FIG. 3). More preferably, said inner ring 15 is fixed to the tube bundle 6 and said outer ring 16 is structurally independent from the tube bundle 6. In a preferred embodiment, said inner ring 15 is fixed (e.g. welded) to a diaphragm 18 of the tube bundle 6, while the outer ring 16 is supported by one of the collectors of the catalytic beds, for example the inner collector 26 of the catalytic bed 3.3.

While passing from one bed to another, the partially reacted gas stream can be (optionally) mixed with a quench gas. To this purpose, the figures show a distributor 20, for example a torus-like distributor, for delivering a quench gas flow in the annular chamber 28. Said distributor 20 is fed via a pipe 21 passing through the upper bed 3.2.

The catalytic beds are contained within side walls which are at least partially perforated, allowing the passage of the gas. Referring to FIG. 2 and FIG. 3, the bed 3.2 has side walls 22, 23 and a bottom wall 24; the bed 3.3 in a similar way has side walls 25, 26 and a bottom wall 27. As mentioned above, the inner wall 26 may act as a support means for the outer ring 16 of the seal 14. The outer and inner collectors of each catalytic bed can include, in more preferred embodiments, a double wall system according to the "slotted wall" concept disclosed in EP 1818094 and EP 2014356.

Preferably, the flow in the catalytic beds is an axial or axial-radial flow.

The converter 1 operates as follows. A fresh charge of reactant gas, or at least a major part thereof, enters the converter 1 and flows inside the tube bundle 6 of the common heat exchangers 5, and then inside the tubes of the top heat exchanger 4, until it reaches the top of the converter. In ammonia converters, for example, said reactant gas is a mixture of nitrogen and hydrogen. While flowing inside the tubes, the fresh charge is heated by means of heat released by the cooling hot products, flowing in the shell side of the exchangers.

At the top of the converter, the pre-heated gas is possibly mixed with a non-preheated portion of the same charge (cold shot), to adjust the bed inlet temperature, and enter the first bed 3.1. After a first stage of conversion in the first bed 3.1, the partially reacted hot gas are directed in the shell side of the first exchanger 4 for a first cooling stage, where they release heat to the fresh charge inside tubes; the so obtained cooled product gas stream passes in the second bed 3.2 for a second stage of reaction.

The further reacted gas stream leaving said second bed 3.2 is cooled in the space 12, that is in the first portion of the shell side of the common heat exchanger 5, releasing heat to the reactants flowing in the tubes 6. After said passage in the space 12, the gas stream flows through the gap 11 in the annular region 28 between the two beds 3.2 and 3.3 and, from here, enters the third bed 3.3. It can be noted that the sealing means 14 avoid a direct gas passage from space 12 to space 13, that would result in a bypass of the bed 3.3.

After a third stage of reaction in said bed 3.3, the gas enters the space 13, that is the second portion 13 of shell side of exchanger 5, for another cooling stage before admission in the last bed 3.4.

It can be appreciated that the common heat exchanger 5 is able to carry out the same duty of two separate prior-art heat exchangers, owing to the partitioning of the shell side. However, the common tube sheet eliminates the need of two tubesheets. A conventional design with two separate heat exchangers, in fact, would need four tubesheets instead of the two tubesheets 7, 8.

The catalytic cartridge 2, including the catalytic beds, the heat exchangers and ancillary equipments such as piping, connections, etc. can be realized as a stand-alone item, with the necessary connections for inputs and outputs.

A cartridge according to the invention can be fitted in the pressure vessel of a pre-existing converter, provided that the pressure vessel has a full-opening as in FIG. 1, i.e. an opening having the same (full) diameter of the converter itself. Hence, an aspect of the invention is a revamping of a catalytic converter with a full-opening, including the steps of removing the existing internals (including catalytic beds and heat exchanger) and introducing a pre-assembled cartridge according to the invention in the vessel, e.g. the vessel V in FIG. 1.

Figure 4:
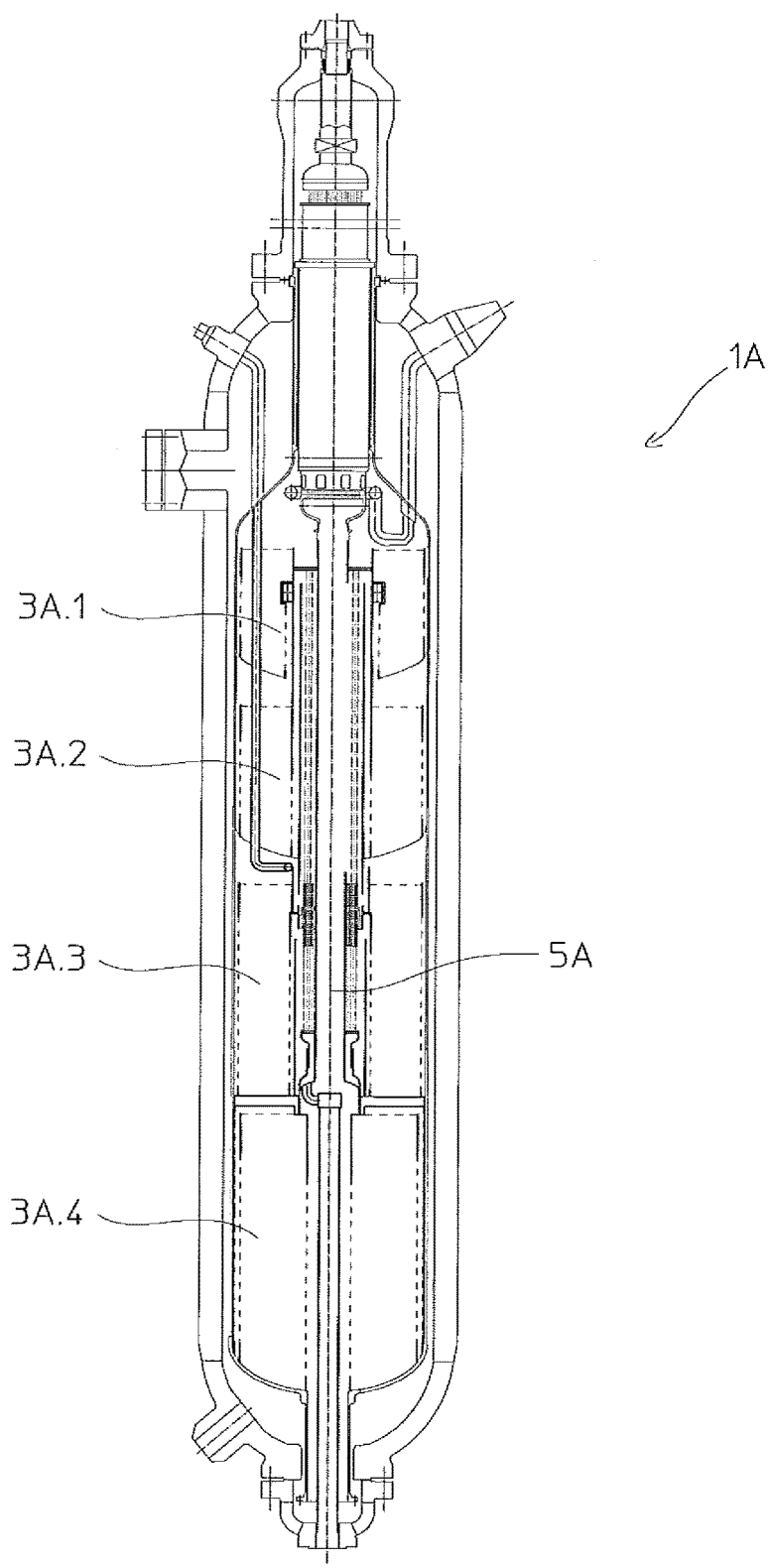
FIG. 4 is a simplified cross section of a partial-opening catalytic reactor realized in accordance with another embodiment of the invention.

The invention however is not limited to full-opening converters. FIG. 4 shows an application of the invention to a partial-opening converter 1A. Using the same numerals of FIG. 1, for simplicity, the converter 1A has four catalytic beds 3A.1 to 3A.4, and a tube heat exchanger 5A which is in common between the top three catalytic beds. Suitable sealing means, for example in accordance with the seal 14 as described above, prevent a bypass of the catalytic beds 3A.2 and 3A.3 respectively.

The invention claimed is:

1. A multi-bed catalytic converter comprising a pressure vessel, a plurality of superimposed catalytic beds, said beds being configured with a cylindrical annular container and an axial core passage, and means for the inter-bed cooling of a gas stream between at least two of said catalytic beds, wherein said means for inter-bed cooling include a heat exchanger which comprises:

heat exchange bodies which extend axially and without a solution of continuity through the core passages of at least two consecutive catalytic beds, and a wall system which is also arranged in said core passages and surrounds said heat exchange bodies, to define a boundary of a shell side of said heat exchanger, wherein said wall system is structured in such a way that:

the shell side of said heat exchanger comprises at least a first space and a second space, and said first space has a gas inlet and a gas outlet, the inlet being in communication with an outlet of a first of said consecutive catalytic beds, to receive a hot gas leaving said first bed, and the outlet being in communication with the inlet of a second of said consecutive catalytic beds, so that the inter-cooled gas leaving said first space can enter said second bed for further conversion, and said second space has a gas inlet in communication with the outlet of said second bed, and wherein the converter also comprises sealing means to prevent a direct gas passage from said first space to said second space.

2. The converter according to claim 1, the outlet of the first space being in communication with the inlet of said second catalytic bed via a chamber located between said least two consecutive catalytic beds.

3. The multi-bed catalytic converter according to claim 1, said wall system comprising a first cylindrical wall and a second cylindrical wall, the first wall surrounding an upper portion of said heat exchange bodies and the second wall surrounding a lower portion of said heat exchange bodies, and wherein the second wall is distanced from the first wall, so that said first wall and second wall form a shell with a gap.

4. The converter according to claim 3, said first wall being located in the central passage of said first catalytic bed, and said second wall being located in the central passage of said second catalytic bed, and said gap being located between said first and second catalytic beds.

5. The converter according to claim 1, said sealing means including a first elastic ring member and a second elastic ring member, and a seal between said elastic members.

6. The converter according to claim 5, said seal being a labyrinth seal.

7. The converter according to claim 5, said first member being fixed to the heat exchange bodies, and said second member being fixed to a wall of one of said consecutive catalytic beds.

8. The converter according to claim 1, said heat exchange bodies being a bundle of tubes.

9. The converter according to claim 1, comprising also a quench line arranged to feed a quench gas for mixing with the partially reacted gas stream leaving said first space of the shell side of said heat exchanger.

10. The converter according to claim 1, said heat exchanger being extended through more than two consecutive catalytic beds.

11. The converter according to claim 1, comprising a structurally independent catalytic cartridge, and said catalytic beds and means for inter-bed cooling being part of said catalytic cartridge.

12. The converter according to claim 1, comprising:

four superimposed catalytic beds, a top inter-bed exchanger, fitted in the central passage of the first annular bed and arranged to cool the hot flow leaving said first bed, and a bottom inter-bed exchanger, with heat exchange bodies in common between the second bed and third bed.

13. The converter according to claim 1, the converter being for the synthesis of ammonia or for the synthesis of methanol.

14. A catalytic cartridge for use in a multi-bed catalytic converter, said cartridge comprising:
- a plurality of superimposed catalytic beds, said beds being configured with a cylindrical annular container and an axial core passage, and means for the inter-bed cooling of a gas stream between at least two of said catalytic beds, wherein said means for inter-bed cooling include a heat exchanger which comprises:
- heat exchange bodies which extend axially and without a solution of continuity through the core passages of at least two consecutive catalytic beds, and
- a wall system which is also arranged in said core passages and surrounds said heat exchange bodies, to define a boundary of a shell side of said heat exchanger, and wherein said wall system is structured in such a way that:
- the shell side of said heat exchanger comprises at least a first space and a second space, and
- said first space has a gas inlet and a gas outlet, the inlet being in communication with an outlet of a first of said consecutive catalytic beds, to receive a hot gas leaving said first bed, and the outlet being in communication with the inlet of a second of said consecutive catalytic beds, so that the inter-cooled gas leaving said first space can enter said second bed for further conversion, and said second space has a gas inlet in communication with the outlet of said second bed, and also comprising sealing means to prevent a direct gas passage from said first space to said second space.

15. A method for the revamping of a converter, said converter having a pressure vessel with a full opening and the method comprising the steps of:
- removing the existing internals including catalytic beds and heat exchange means, and
- introducing a pre-assembled cartridge according to claim 14 in the pressure vessel of said converter, via said full opening.

* * * * *